United States Patent [19]

Tajima et al.

[11] Patent Number: 5,084,888
[45] Date of Patent: Jan. 28, 1992

[54] LASER MEDIUM FOR USE IN A COMPOSITE SLAB TYPE LASER

[75] Inventors: Hidemi Tajima, Hamura; Takayasu Mochizuki, Akishima, both of Japan

[73] Assignee: Hoya Corporation, Tokyo, Japan

[21] Appl. No.: 633,780

[22] Filed: Dec. 26, 1990

[30] Foreign Application Priority Data

Dec. 29, 1989 [JP] Japan .................................. 1-341148

[51] Int. Cl.$^5$ .............................................. H01S 3/14
[52] U.S. Cl. ......................................... 372/39; 372/66; 372/73; 372/72
[58] Field of Search ....................... 372/39, 66, 92, 73, 372/72, 41

[56] References Cited

U.S. PATENT DOCUMENTS

4,839,902  6/1989  Guch, Jr. .............................. 372/72

Primary Examiner—Léon Scott, Jr.
Attorney, Agent, or Firm—Oliff & Berridge

[57] ABSTRACT

A laser medium for use in a composite slab type laser, wherein laser active layers are divided in the longitudinal direction of the laser medium by removing at least a part of a region, which is deviated from a zigzag path and a laser beam to be extracted therefrom does not pass through. Thereby amplified spontaneous emission can be weaken and parasitic oscillation can be effectively suppressed, and further laser oscillation and light amplification can be performed for a long period of time.

15 Claims, 5 Drawing Sheets

LASER MEDIUM FOR USE IN A COMPOSITE SLAB TYPE LASER

BACKGROUND OF THE INVENTION

1. Field of The Invention

This invention generally relates to a laser medium and more particularly to a laser medium for use in a composite slab type laser (hereunder referred to simply as a composite type slab laser medium) which can weaken amplified spontaneous emission (hereinafter abbreviated as ASE) and suppress parasitic oscillation to thereby increase an oscillation efficiency or an amplification efficiency.

2. Description of The Related Art

As a conventional solid state laser medium, is publicly known a slab laser medium which has a slab structure provided with two parallel planes facing each other as reflecting inner surfaces (hereunder referred to simply as reflecting surfaces) as disclosed in, for example, Japanese Patent Application Publication No. 48-15599 Official Gazette. This conventional slab laser medium is used to perform laser oscillation or optical amplification by extracting a laser beam therefrom. Further, in this conventional slab laser medium, the laser beam follows a zigzag path undergoing internal reflection at the alternate reflecting surfaces. Therefore, even if the distance between the reflecting surfaces is short, the optical path followed by the laser beam can be sufficiently long. In other words, even if the laser medium is made thin, a desired path length can be obtained. Thereby, the laser medium can be efficiently cooled. Thus, large pump energy can be supplied to the laser medium. This realizes laser oscillation providing a large laser output.

Further, in general, where a thermal gradient is presented within a laser medium, thermal lensing and thermal birefringence occurring due to thermally induced distortion and stress cause phase differences among laser beams to be extracted. This results in degradation of beam quality. However, in case of this conventional slab laser medium, the laser beam goes along the zigzag path between the reflecting surfaces as described above. Thus, the laser beam equally and repeatedly travels obliquely to a transverse direction, in which the thermal gradient is presented, perpendicular to the two reflecting surfaces. Consequently, the phase difference due to unevenness of refractive index in the laser medium, which is caused by the thermal lensing and the thermal birefringence, is substantially cancelled, and further a laser beam with relatively good beam quality can be obtained.

Further, in order to obtain a larger laser output and good beam quality, it is favourable for such a slab laser to have the thinnest possible laser medium. On the other hand, such a slab laser has a minimum thickness required to maintain prescribed mechanical strength and accuracy of finish of the reflecting surfaces to be formed in such a fashion to be in parallel with and face each other. Thus, there is a lower limit to thickness of the conventional slab laser which can be realized by using ordinary methods.

As a conventional laser medium obtained by making better use of the characteristic of this slab laser medium to improve beam quality and lower the lower limit of thickness, is publicly known what is called a composite slab type laser medium proposed by J. L. Emmett et al (see *The Potential of High-Average-Power Solid State Lasers* UCRL-53571, Lawrence Livermore National Laboratory, California, 1984). This composite slab type laser medium is devised to make a thermal gradient therein very small by including a laser activating material only in a specific region between the reflecting surfaces and moreover making the layer including the region containing the activating material very thin. Generally, in a slab laser medium, temperature is high in a central portion in the transverse direction between the two reflecting surfaces. Further, the closer to end portions (i.e., to the reflecting surfaces) a portion, the lower temperature. Thus, by removing the laser activating material from the central portion, generation of heat therein is prevented. Moreover, by making laser pumping regions of the end portions extremely thin, the thermal gradient in the transverse direction is made to be very small.

Figure 2:
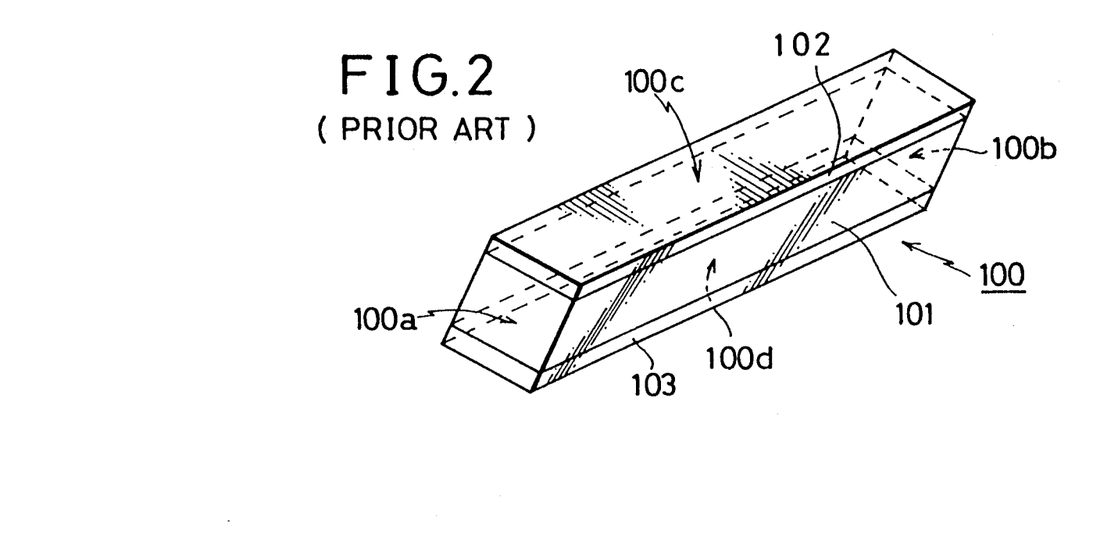
FIG. 2 is a perspective view of a conventional composite slab type laser medium.

FIG. 2 is a perspective view showing the construction of a conventional composite slab type laser medium. In this figure, reference numeral 100 designates the conventional composite slab type laser medium; 100a an incident surface; 100b an exit surface; 100c and 100d reflecting surfaces facing each other; 101 a substrate portion forming an inactive layer; and 102 and 103 laser glass plate portions forming an active layer. The incident and exit surfaces 100a and 100b are formed in such a manner to be inclined at a predetermined angle, which meets Brewster's condition, away from the reflecting surfaces 100c and 100d when a laser beam is incident on the surfaces 100c and 100d in the direction parallel to the reflecting surfaces 100a and 100b. These laser glass plate portions 102 and 103 contain a laser activating material. In contrast, the substrate portion 101 does not contain any laser activating material. A mirror (not shown) to be used for causing optical resonance is placed at both ends of the laser medium in the longitudinal direction. Thereafter, when the laser medium 100 is pumped by an external pump source (not shown), is generated a laser beam which resonates in the laser medium (hereunder sometimes referred to as laser resonance light) which follows a zigzag path undergoing internal reflection at the alternate reflecting surfaces. Thus, laser oscillation is performed. In this case, a laser pumping is effected only in the laser glass plate portions 102 and 103 and namely is not performed in the substrate portion 101. As a result, in the laser medium 100, the rise of temperature is suppressed and a temperature distribution becomes uniform in the transverse direction.

Further, results of performance tests of a composite slab type laser, of which the laser medium is manufactured for trial by inventors of the instant invention, reveal that when the pump energy applied to the slab laser is less than a predetermined value, it is favourable to employ the thinnest possible glass plates, which contain the most possible laser activating material, as the laser glass plate portions 102 and 103 and that when the pump energy is increased and becomes equal to or larger than a certain value, a gain of the laser is driven into saturation. As a result of further study, it is found that the latter phenomenon is caused by the ASE and the parasitic oscillation effected in the inside of the laser medium. Incidentally, the ASE is light emitted, which is stimulated and amplified by fluorescence in a laser medium and attenuates energy stored prior to normal laser oscillation and optical amplification. Further, the parasitic oscillation is a phenomenon that in a laser medium, the ASE goes along an optical path other than a normal optical path to be followed by a laser beam which resonates in the laser medium (hereunder sometimes referred to as a resonant optical path) but perform a harmful oscillation by forming a closed resonant optical path. Further, when the ASE and the parasitic oscillation occur, the stored energy is spent for the ASE and the parasitic oscillation, so that energy of the laser beam following the normal optical path cannot be increased and consequently, a larger laser output cannot be obtained.

It has been known that the ASE and the parasitic oscillation occur in a conventional ordinary disk type laser medium and the conventional slab laser medium. Further, with respect to the ordinary slab laser medium, has been proposed a method for weakening the ASE and suppressing the parasitic oscillation.

Namely, a known method for weakening the ASE and suppressing the parasitic oscillation is what is called a segmented spacer method (see "New Slab and Solid-State Laser Technology and Application", *SPIE.*, Vol. 736, p. 38, 1987).

Figure 3:
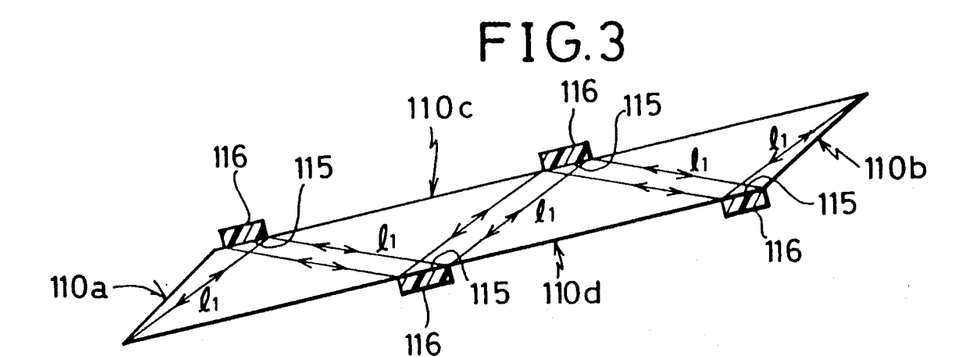
FIG. 3 is a diagram for illustrating a segmented spacer method.

FIG. 3 is a sectional view of an example of application of this segmented spacer to an ordinary slab laser medium 110. As illustrated in this figure, according to this method, gasket members 116, . . . , 116 made of rubber and so on are put into contact with outer surfaces of parts, at which a laser beam is not reflected, of the parallel reflecting planes 110c and 110d in order to prevent conditions of total internal reflection from holding. As described above, in the slab laser medium, a laser beam $l_1$ to be extracted therefrom (hereunder sometimes referred to simply as an extraction beam) goes along a zigzag path undergoing total reflection at the alternate reflecting surfaces. As a consequence, each reflecting surface is scattered with parts of a region 115 (hereinafter referred to as a non-path region), through which the extraction beam $l_1$ does not pass. Therefore, the efficiency of oscillation is not decreased in case where the conditions of total reflection of the laser beam $l_1$ are made not to hold for parts of the non-path region 115. Moreover, by preventing the conditions of total reflection from holding for parts of the non-path region, reflection of light $l_2$ generated by the ASE or the parasitic oscillation having reached the parts of the non-path region 115 can be prevented.

Further, as another method for weakening the ASE and suppressing the parasitic oscillation, is known a method disclosed in Japanese Unexamined Patent Application Publication No. 63-211779 Official Gazette. According to this method, wrapping processing is performed on portions corresponding to the parts, with which the gasket members are put into contact, of the parallel reflecting planes 110c and 110d used for effecting the segmented spacer method to form diffused reflection surfaces thereof. Thereby, parasitic oscillation can be effectively suppressed by suppressing reflection of light emitted due to parasitic oscillation (hereinafter referred to as parasitic oscillation light), which comes from the inside of the laser medium to the portions corresponding to the parts, with which the gasket members are put into contact, of the parallel reflecting planes 110c and 110d, without using gasket members and so on.

Moreover, as still another method for weakening the ASE and suppressing the parasitic oscillation, is known a method disclosed in Japanese Unexamined Patent Application Publication No. 61-287287 Official Gazette. According to this method, sandblasting processing is performed on portions corresponding to the parts, with which the gasket members are put into contact, of the parallel reflecting planes 110c and 110d used for effecting the segmented spacer method to form sandblasted surfaces thereof. Alternately, etching processing is performed on such portions to form diffused reflection surfaces thereof. Otherwise, V-shaped grooves are formed in portions corresponding to the non-path regions 115. Thereby, parasitic oscillation can be effectively suppressed by suppressing reflection of parasitic oscillation light which comes from the inside of the laser medium to the portions corresponding to the parts, with which the gasket members are put into contact, of the parallel reflecting surfaces 110c and 110d.

However, when the inventors of the instant invention applied the segmented spacer method to a composite slab type laser medium, expected effects were not obtained. According to the inventors' study of the cause, the conclusion was as follows.

The segmented spacer has been developed on the basis of an idea that reflection of a laser beam at parts of the non-path region is restrained by making the conditions of total reflection from holding for the parts of the non-path region. Thus, the gasket member 116 is used as a member for making the conditions of total reflection from holding. In other words, the ASE and the parasitic oscillation light impinge on the reflecting surface at a certain angle can be effectively made extinct by using the segmented spacer, while the segmented spacer method is ineffective against the ASE and the parasitic oscillation light go on in parallel with the reflecting surfaces. Generally, in an ordinary slab laser medium, a relatively large part of the ASE and the parasitic oscillation light impinges on the reflecting surface at a certain angle, so that the segmented spacer method is effective to a certain extent.

However, in case of the composite slab type laser medium, most part of the parasitic oscillation light advances in the laser glass plate portions 102 and 103 in parallel with the reflecting surfaces 100c and 100d. Consequently, if the segmented spacer method is applied to the composite slab type laser medium without change, expected effects cannot be obtained.

Further, the results of the experiments made by inventors of the present invention reveals that the gasket member 116 is very easily deteriorated by iteration of the laser oscillation and optical amplification. From an investigation, it is found that the cause of this is a phenomenon that the gasket member 116 is not also heated by heat conducted from the laser medium but also absorbs pumping light and light emitted due to parasitic oscillation light and generates heat and thus temperature of the gasket member 116 is liable to rise to a permissible temperature and higher. Especially, this phenomenon is conspicuously presented in case that an air-cooling method with low cooling efficiency is employed for cooling the laser medium.

Moreover, in case of the method disclosed in Japanese Unexamined Patent Application Publication No. 63-211779 Official Gazette, differently from the segmented spacer method, it is unnecessary to use gasket members having low heat resistance, and degradation of gasket members owing to heat does not occur. This method, however, has a problem of suppressing parasitic oscillation light advancing in parallel with the reflecting surfaces similarly as the segmented spacer method does. Thus, similarly as in case of the segmented spacer method, if the method disclosed in Japanese Unexamined Patent Application Publication No. 63-211779 Official Gazette is applied to the composite slab type laser medium without change, expected parasitic oscillation suppressing effects cannot be obtained. In addition, as described above, according to this method, the wrapping processing is performed on the surfaces of the laser glass plate portions. Thus, the surfaces of the laser glass portions are as good as scratched in a sense. It is well known that scratches on the surface of glass considerably decrease mechanical strength of the glass and a maximum stress, which is a cause of thermal destruction occurring when pump light is absorbed, is generated on the surface of the laser medium. Thus, this method has a drawback in that the laser glass plate portions are liable to cause thermal destruction and consequently, there is a limit to an average input of the pump light applicable to the laser medium.

Furthermore, the method disclosed in Japanese Unexamined Patent Application Publication No. 61-287287 Official Gazette is similar to the method disclosed in Japanese Unexamined Patent Application Publication No. 63-211779 Official Gazette in respect of scratching the surface of glass and vicinities thereof, and accordingly has the similar defect as the method disclosed in Japanese Unexamined Patent Application Publication No. 63-211779 Official Gazette.

The present invention is intended to obviate the above described drawbacks of the prior art.

It is therefore an object of the present invention to provide a composite slab type laser which can effectively weaken ASE and suppress parasitic oscillation and stably perform laser oscillation and light amplification for a long period of time.

SUMMARY OF THE INVENTION

To achieve the foregoing object and in accordance with a first aspect of the present invention, there is provided a composite slab type laser medium having a layer of a first type and two layers of a second type holding the layer of the first type therebetween and containing a laser activating material, wherein the layer of the first type is made up of a member that contains a laser activating material of which the quantity is less than that of the laser activating material contained in the layers of the second type or contains substantially no laser activating material, and the sides of the layers of the second type opposed to boundary surfaces between the layer of the first type and the layers of the second type are the two parallel surfaces facing each other, and being used to perform laser oscillation or optical amplification by extracting a laser beam, which follows a zigzag path undergoing internal reflection at the alternate reflecting surfaces therein, therefrom, and wherein the second layers are divided in the longitudinal direction of the laser medium by removing at least a part of a region, which is deviated from the zigzag path and the laser beam to be extracted therefrom does not pass through.

Thereby, the optical path to be followed by the parasitic oscillation light, which mainly advances in parallel with the reflecting surfaces in the laser medium, can be divided without dividing normal resonant optical paths. Moreover, the layers of the second type, which are active layers, are divided in the longitudinal direction of the laser medium. Thus, there is no necessity of scratching the surface of the second layer and the vicinities thereof. Consequently, the composite slab type laser medium can obstinately resist thermal destruction.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
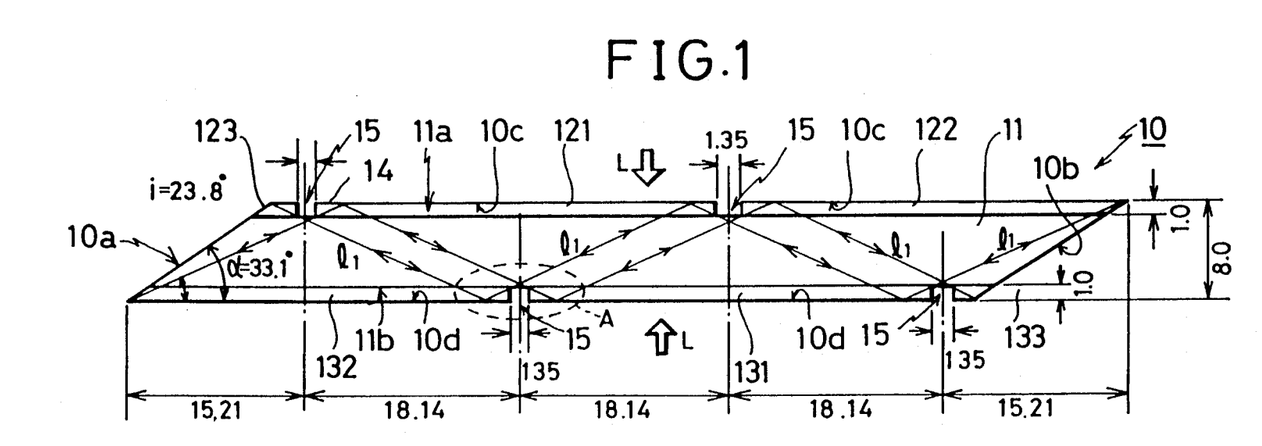
FIG. 1 is a sectional view of a first embodiment of the present invention.
Figure 4:
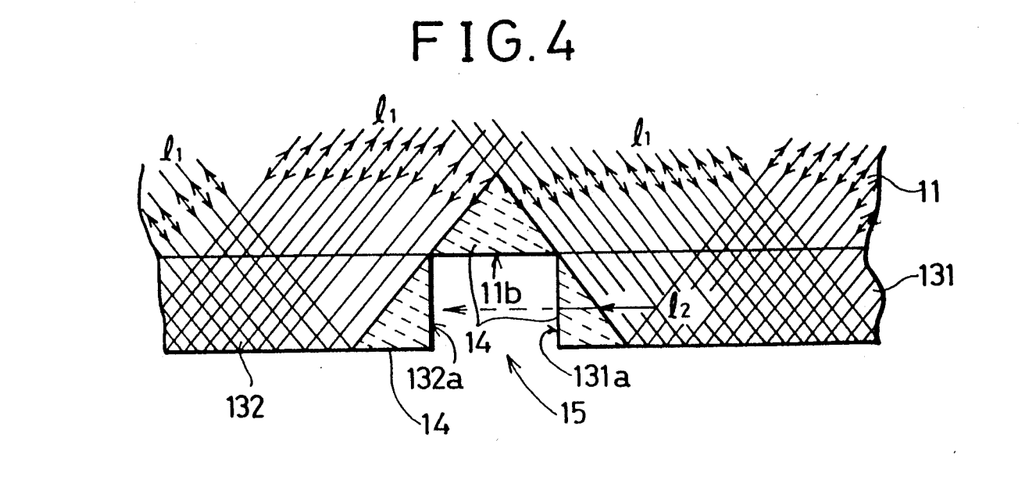
FIG. 4 is an enlarged sectional view of a part A of FIG. 1.
Figure 5:
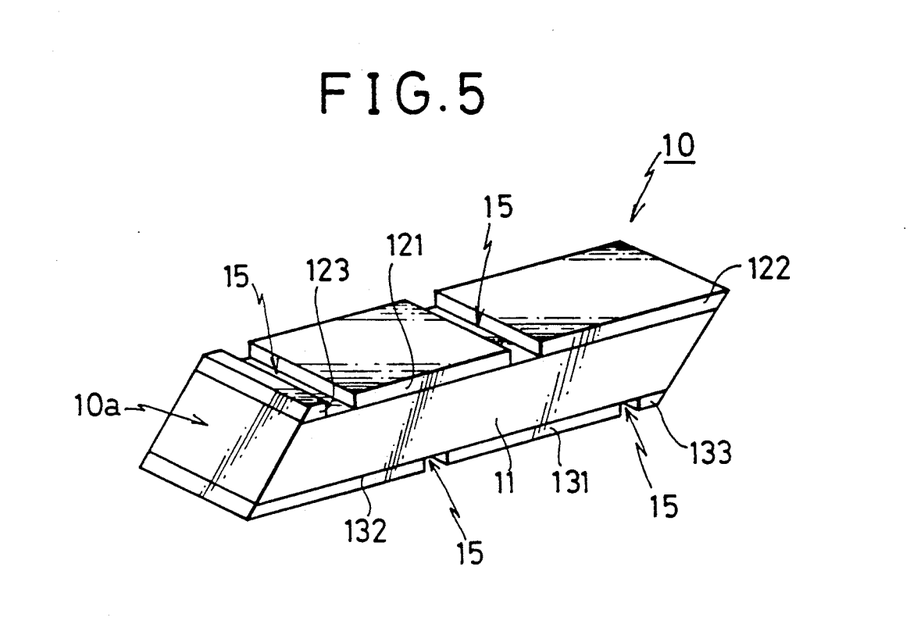
FIG. 5 is a perspective view of the first embodiment of the present invention.

First, by referring to FIGS. 1, 4 and 5, a first embodiment of the present invention will be described in detail hereinbelow. FIG. 1 is a sectional view of a first embodiment (i.e., a first composite slab type laser medium) of the present invention. Further, FIG. 4 is an enlarged sectional view of a part A indicated by a dashed circle in FIG. 1. FIG. 5 is a perspective view of the first embodiment.

In these figures, reference numeral 10 designates a laser medium; 11 a substrate portion composing an inactive layer; 121, 122, 123, 131, 132 and 133 glass substrate portions made of glass (hereunder referred to as laser glass plate portions) composing active layers; and 14 a non-path region portion.

The laser medium 10 is a plate-like portion and is approximately 8 millimeters (mm) in thickness, 25 mm in width and 85 mm in length. Further, a top and back surfaces (hereunder sometimes referred to as surfaces in the transverse direction) of this laser medium 10, as viewed in FIG. 2, are reflecting surfaces 10c and 10d, respectively. Further, an incident and exit end surfaces 10a and 10b facing each other in the longitudinal direction are formed to be inclined at a predetermined angle $\alpha$ away from the longitudinal direction and are abraded like mirrors. Incidentally, the angle is set such that a laser beam $l_1$, which enters and exits from the laser medium the in the longitudinal direction, meets Brewster's condition. (In this embodiment, the angle $\alpha$ is set to be 33.1°). Thereby, total reflection of only polarized light can be effected at the alternate reflecting surfaces 10c and 10d.

Further, as illustrated in FIGS. 1 and 2, this laser medium 10 is constructed by welding two groups of the laser glass plate portions 121-123 and 131-133 (respectively corresponding to the above described two layers of the second type and hereinafter sometimes referred to as the layers of the second type) to the top and back surfaces of the substrate portion 11 (corresponding to the above described layer of the first type and hereinafter sometimes referred to as the layer of the first type), respectively.

The substrate portion 11 is a plate-like portion made of transparent phosphate glass, which contains substantially no laser activating material, and is approximately 6 millimeters (mm) in thickness, 25 mm in width and 80 mm in length. This substrate portion 11 is an inactive layer which does not effect laser oscillation and optical amplification, substantially. Further, a refractive index $n_d$ and a thermal expansion coefficient $\epsilon$ of the glass composing the substrate portion 11 are 1.55 and $98 \times 10^{-7}/°C.$, respectively.

In passing, the substrate portion 11 may contain laser activating material a little. In such a case, it is necesary that a quantity of the laser activating material contained in the substrate portion 11 should be less than a quantity of the laser activating material contained in the laser glass plate portions 121-123 and 131-133. Namely, it is necessary that quantity of heat generated in the substrate portion 11 due to laser pumping should be less than a quantity of heat generated in the laser glass plate portions.

Further, as illustrated in FIG. 1, the laser glass plate portions 121-123 and 131-133 are welded to the surfaces 11a and 11b facing each other in the longitudinal direction in such a manner that a group of the laser glass plate portions 121-123 are separated from another group of the laser glass plate portions 131-133 by a predetermined distance (1.35 mm in this embodiment). Namely, parts of the layers of the second type, which are active layers, are removed and thus the layers of the second type are divided into sections in the longitudinal direction. In this case, separation portions 15 are made to be positioned in the non-path regions 14, through which the laser beam l$_1$ going along a zigzag path in the laser medium 10 at the time of effecting laser oscillation and optical amplification does not pass. Further, as viewed in FIG. 4, a top end of the left end surface of the laser glass plate portion 131 and a top end of the right end portion of the laser glass plate portion 132 are positioned on lines of intersection of a boundary surface between the laser beams l$_1$ and the non-path regions 14 and the surface 11b of the substrate portion 11.

Further, the laser glass plate portions 12, ..., 12 and 13, ..., 13 are plate-like portions each made of phosphate glass containing $Nd^{3+}$ ions of $1 \times 10^{21}$/c.c. as laser activating material, and is nearly 1 mm in thickness and 25 mm in width. Incidentally, the length and arrangement of the laser glass plate portions are geometrically determined from the geometry of the zigzag path. Namely, the length and arrangement of the laser glass plate portions are necessarily determined by positioning the separation portions 15 in the non-path regions 14 in the above described manner. This embodiment is constructed such that the laser resonance light (or light to be amplified), which is incident on the incident and exit end surfaces 10a and 10b in the direction parallel to the reflecting surfaces 10c and 10d and meets Brewster's condition (e.g., in this embodiment, the laser beam is incident on the reflecting surface 10d at an angle i equal to 23.8 degrees), is reflected four times by the reflecting surfaces 10c and 10d (i.e., is reflected two times by each of the surfaces 10c and 10d) and thereafter is extracted to the outside of the laser medium. Thus, the central positions of the non-path regions 14 in the longitudinal direction of the laser medium 10 are respectively positioned 15.21 mm (on the reflecting surface 10c), 33.35 mm (on the reflecting surface 10d), 51.49 mm (on the reflecting surface 10c) and 69.63 mm (on the reflecting surface 10d) away from the left end of the laser medium 10 of FIG. 1, as viewed in this figure. Therefore, the length of each of the laser glass plate portions 121-123 and 131-132 are as follows:

The length of each of the portions 121 and 131 is about 35 mm;

The length of each of the portions 122 and 132 is about 33 mm; and

The length of each of the portions 123 and 133 is about 4 mm.

Furthermore, a refractive index $n_d$ and a thermal expansion coefficient $\epsilon$ of the glass composing the laser glass plate portions 121-123 and 131-133 are 1.549 and $100 \times 10^{-7}/°C.$, respectively.

When irradiated with predetermined pump light L, these laser glass plate portions 121-123 and 131-133 performs stimulated emissions of light of the wavelength is 1.06 micrometer ($\mu$m). Further, when the laser glass plate portions are positioned in a predetermined resonant optical path, laser oscillation occurs at wavelength of 1.06 $\mu$m. Moreover, when a laser beam passes through the laser glass plate portion, light amplification is effected.

Moreover, surfaces of the laser glass plate portions 121-123 and 131-133 are abraded like mirrors (flatness: $\lambda$ (632 nanometers (nm)). Further, the abraded surfaces of the laser glass plate portions 121-123 and 131-133 are alternately arranged and are pushed and welded to the surfaces 11a and 11b of the substrate portion 11 as illustrated in FIG. 1 (welding temperature: 450°-550° C.). Further, the other surface of each of the laser glass plate portions 121-123 and 131-133 is a boundary surface between the portions 121-123 and 131-133 and the outside thereof and composes the reflecting surfaces facing each other. In addition, the refractive index of the laser glass plate portions 121-123 and 131-133 is different from that of the substrate portion 11 by a quantity equal to or less than 0.03 and the thermal expansion coefficient of the laser glass plate portions 121-123 and 131-133 is different from that of the substrate portion 11 by a quantity having an absolute value equal to or less than $5 \times 10^{-7}/°C.$ in such a manner to prevent occurrence of Fresnel reflection and thermal distortion as far as possible. In passing, end surfaces of the portions 121-123 and 131-133 in the direction of their optical axis are not abraded (flatness: 10 micron ($\mu$) or so).

Hereunder, will be considered effects obtained in case where the laser having the above described arrangement is Q-switched. When mirrors for effecting laser resonance are placed at the both ends of the laser medium 10 in the longitudinal direction and further the laser medium 10 is irradiated with pump light L from a pump source (not shown), laser resonance light l$_1$ is generated between the mirror and the laser medium. The laser resonance light l$_1$ follows a zigzag path undergoing total reflection at the alternate reflecting surfaces 10c and 10d facing each other in the transverse direction. In this case, a region portion 14 deviated from the zigzag path (i.e., a non-path region portion) is formed in the laser medium 10. Namely, the non-path region portion 14 is a portion through which the laser resonance light $l_1$ does not pass. As above described, portions contained in the non-path regions 14 of the active layers in case of the conventional composite slab type laser medium, are removed and thus the separation portions 15 are formed. Thus, ASE $l_2$ or parasitic oscillation light generated in the laser glass plate portion 131 and traveling from left to right, and vice versa, as viewed in FIG. 4, can be emitted from a left end surface 131a to the separation portion 15. At that time, the ASE is attenuated due to Fresnel loss when passing through the left end surface 131a. For example, in case the ASE is generated in the laser glass plate portion 133 and then passes through one of the separations 15, the portion 131 in this order and another one of the separation portions 15 and finally reaches the laser glass plate portion 122, a loss at a boundary surface of each of these composing elements owing to Fresnel reflection is about 4% and thus, total Fresnel loss becomes approximately 17.5% Moreover, the ASE is attenuated also due to scattering thereof caused on the end surface 131a which is not abraded. Furthermore, the ASE emitted to the separation portions 15 is not pumped therein and therefore is attenuated therein. Thereby, the ASE advancing in the longitudinal direction of the laser glass potions can be effectively weaken and parasitic oscillation can be suppressed.

As a matter of course, ASE is generated not only in the longitudinal direction but in the traverse direction. However, the projective component of an optical path onto the traverse direction is extremely short. Therefore, in the traverse direction, attenuation of the stored energy is very little in comparison with the attenuation of the stored energy in the longitudinal direction. Thereby, in case of this embodiment, the attenuation of the stored energy due to the ASE and the parasitic oscillation can be effectively suppressed, and oscillation and amplification with good efficiency can be achieved.

Additionally, in this embodiment, there is no necessity of using gasket members made of rubber and so forth. Moreover, it is unnecessary to scratch the laser glass plate portions 121-123 and 131-133. Thus, this embodiment can endure iterated oscillation attended with a large laser output for a long period of time.

Figure 6:
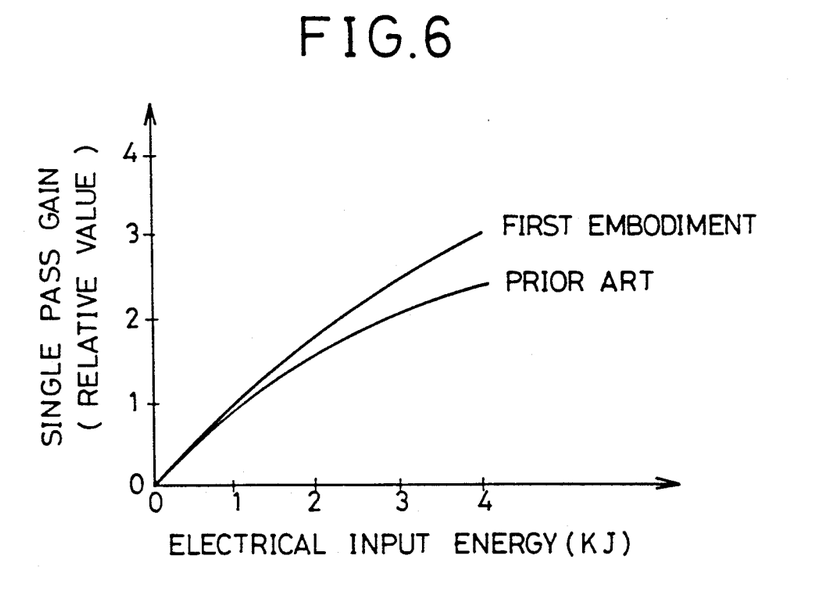
FIG. 6 is a graph for illustrating characteristics of the first embodiment of the present invention.

Referring next to FIG. 6, there is illustrated a graph showing results of measurement of a single pass gain (=optical path length×a gain) of the laser medium 10 of this embodiment and of a single pass gain of a prior art composite slab type laser medium which has the same structure as the laser medium of this embodiment does except being provided with no separation portions. In FIG. 6, the vertical axis represents single pass gains expressed by relative values; the horizontal axis electrical input energy (i.e., input pump energy) expressed in kilojoule (kJ).

Figure 7:
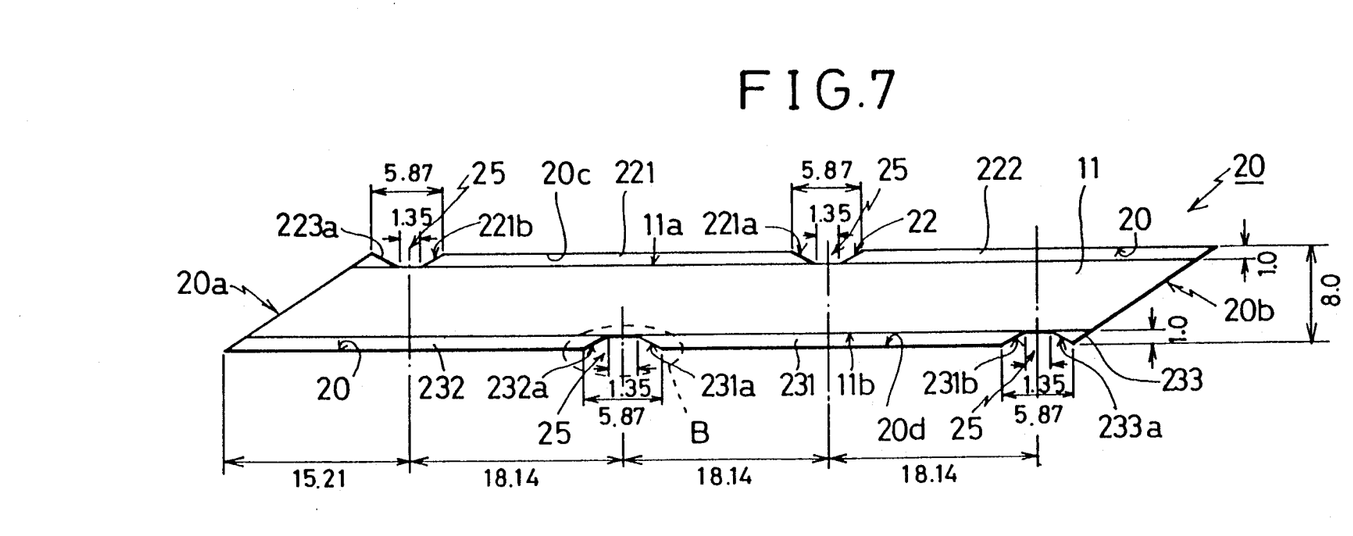
FIG. 7 is a sectional view of a second embodiment of the present invention.

Next, a second embodiment of the present invention will be described in detail hereinbelow. FIG. 7 is a sectional view of the second embodiment of the present invention. Further, FIG. 8 is an enlarged sectional view of a part B of FIG. 7.

In this embodiment, the laser medium 20 has the same construction as the first embodiment does, except that predetermined end surfaces in the longitudinal direction of laser glass plate portions 221-223 and 231-233 corresponding to the laser glass plate portions 121-123 and 131-133 of the first embodiment are inclined. Therefore, composing elements of the second embodiment, which are the same as the corresponding elements of the first embodiment, are designated by the same reference numerals as used to the corresponding elements of the first embodiment. Further, detailed descriptions of the composing elements of the second embodiment, which are the same as the corresponding elements of the first embodiment are omitted herein for brevity of description. Hereunder, the differences between the first and second embodiments will be mainly described.

In this embodiment, are inclined end surfaces 221a, 221b, 222a, 223a, 231a, 231b and 232'a in the longitudinal direction of the laser glass plate portions 221-223 and 231-233 which are in contact with surfaces of the separation portions 25, ..., 25 corresponding to the separation portions 15, ..., 15. For instance, as illustrated in FIG. 8, the left end surface 231a is formed in such a manner to be inclined at an angle $\beta(\beta=23.8°$ in this embodiment) away from a boundary surface 11a between the substrate portion 11 and the laser glass plate portion 231. By setting the inclination angle to be 23.8 degrees as described above, the left end surface 231a is fromed along the boundary surface between the region (hereunder sometimes referred to as the path region) including the optical paths and the non-path region of FIG. 4. In passing, it is not necessary to form the inclined left end surface 231a along the bundary surface between the path region and the non-path region. In short, the end surfaces 221a, 221b, 222a, 223a, 231a, 231b and 232a may be inclined such that the optical path to be followed by the ASE recedes away from the laser medium without reducing the non-path regions. Moreover, each of the end surfaces 221b, 222a, 223a, 231a, 231b and 232a is formed in a manner similar to the end surface 231a. Incidentally, reference character 20a designates an incident end surface of the laser medium 20; 20b an exit end surface thereof; and 20c and 20d reflecting surfaces thereof. Further, in the second embodiment, the dimensions and the constitution of each of these end surfaces and the laser glass plate portions 221-223 and 231-233 are the same as those of each of corresponding end surfaces and the laser glass plate portions 121-123 and 131-133 of the first embodiment.

Figure 8:
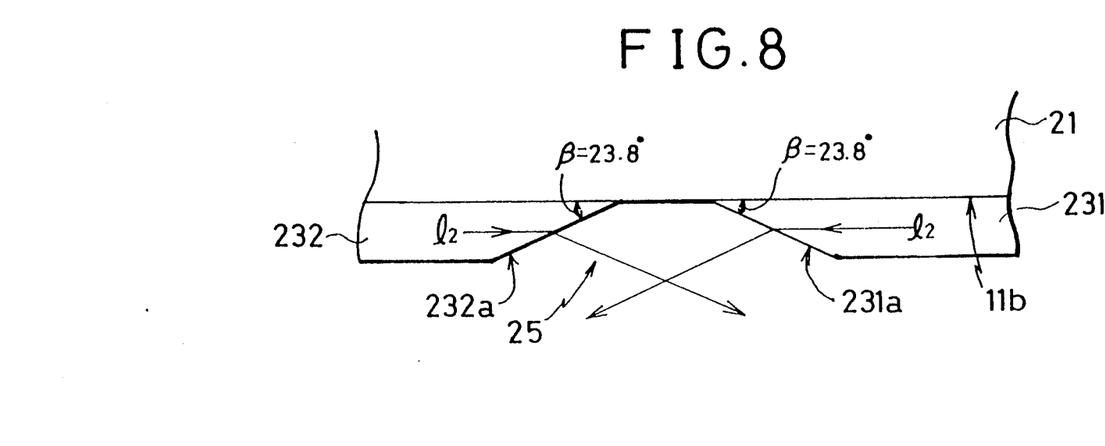
FIG. 8 is an enlarged sectional view of a part B of FIG. 7.

In case of this embodiment, as illustrated in FIG. 8, most of the ASE $l_2$, which goes from right to left in the laser glass plate portion 231, as viewed in this figure, and is emitted from the end surface 231a, goes away from the laser medium and is never incident on the laser glass plate portion 232. Thereby, in comparison with the first embodiment, ASE can be more effectively weaken and parasitic oscillation can be more effectively suppressed. Moreover, can be obtained technical advantage which is similar to the technical advantage of the first embodiment.

Figure 9:
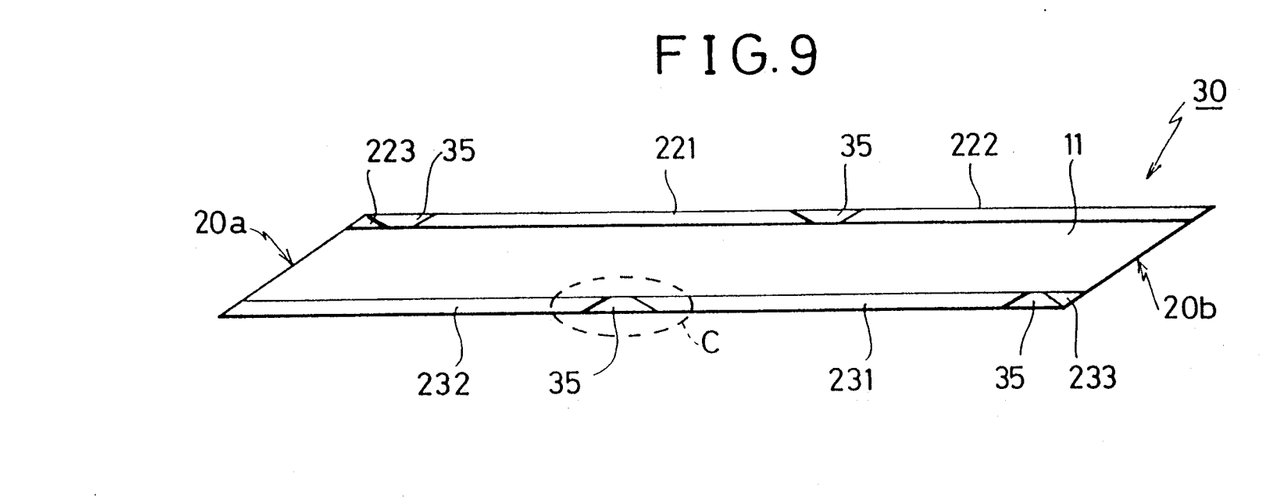
FIG. 9 is a sectional view of a third embodiment of the present invention.
Figure 10:
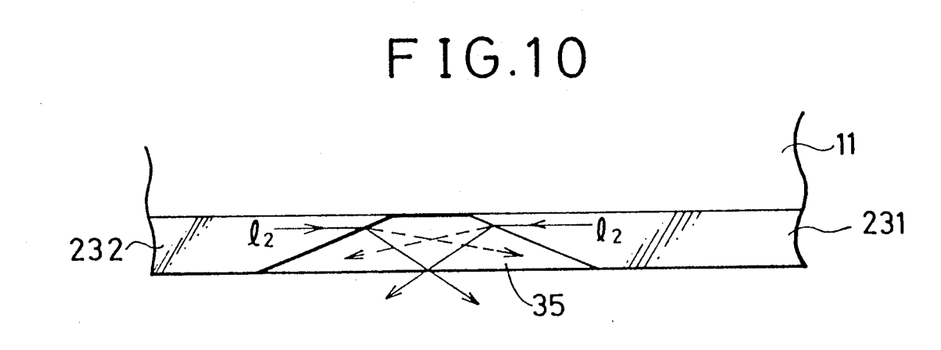
FIG. 10 is an enlarged sectional view of a part C of FIG. 9.

Hereinafter, a third embodiment of the present invention will be described in detail with reference to FIGS. 9 and 10. FIG. 9 is a sectional view of the third embodiment of the present invention, and FIG. 10 is an enlarged sectional view of a part C of FIG. 9.

This embodiment has the same construction as the first embodiment does, except that a member 35 made of transparent glass and having a high refractive index is fitted into the separation protions 25, ..., 25 of the second embodiment and is welded to glass members in the neighborhood in such a manner to be integral with them. Therefore, composing elements of the second embodiment, which are the same as the corresponding elements of the first embodiment, are designated by the same reference numerals as used to the corresponding elements of the second embodiment. Further, detailed descriptions of the composing elements of the third embodiment, which are the same as the corresponding elements of the second embodiment are omitted herein for simplicity of description. Hereunder, the member 35 having a high refractive index will be mainly described.

As the member 35 having a high refractive index, may be used any transparent glass material having a refractive index larger than the refractive index of glass material composing the laser glass plate portions 221-223 and 231-233. An example of such a transparent glass material is a glass material of which the primary components are $P_2O_5$, $K_2O$, $PbO$, $Nb_2O_5$ and $Ta_2O_5$. Incidentally, this glass material contains a blend of $PbO$, $Nb_2O_5$ and $Ta_2O_5$ of 45% by weight.

The refractive index $n_d$ and the thermal expansion coefficient $\epsilon$ of the member 35 are 1.63 and $104 \times 10^{-7}/°C.$, respectively.

In case of the third embodiment, as illustrated in FIG. 10, most of the ASE $l_2$, which goes from right to left in the laser glass plate portion 231, as viewed in this figure, and is incident from the portion 231 on the member 35, goes in the direction indicated by a solid arrow in this figure. Namely, in this embodiment, the ASE $l_2$ is turned away from the laser medium by the member 35. This can prevent the ASE $l_2$ from being once again incident on the laser glass plate portion 232. Thereby, similarly as in case of the second embodiment, ASE can be more effectively weaken and parasitic oscillation can be more effectively suppressed.

Further, in case of the third embodiment, the boundary surfaces between the laser medium 30 and the outside thereof in the transverse direction is a uniform plane. As a result, a flow of a refrigerant, which is in contact with the boundary surface, becomes uniform. Thereby, efficiency of cooling the laser medium can be increased, and temperature distribution in the laser medium can be made more uniform.

While preferred embodiments of the present invention have been described above, it is to be understood that the present invention is not limited thereto. For example, the above described embodiments can be used for effecting laser oscillation or optical amplification of laser light having wavelength other than 1.06 μm. In addition, the composing elements of the laser medium may be made of a known crystalline material such as YAG instead of a glass material.

Further, it is to be understood that other modifications will be apparent to those skilled in the art without departing from the spirit of the invention.

The scope of the present invention, therefore, is to be determined solely by the appended claims.

What is claimed is:

1. A laser medium for use in a composite slab type laser having a layer of a first type and two layers of a second type holding said layer of the first type therebetween, said two layers containing a laser activating material, wherein said layer of the first type is a member that contains a quantity of laser activating material less than that of the laser activating material contained in said layers of the second type, and said layers of the second type having sides opposed to boundary surfaces between said layer of the first type and said layers of the second type, said sides being two parallel surfaces facing each other, said sides being used to perform laser oscillation or optical amplification by extracting a laser beam, the laser beam following a zigzag path and undergoing internal reflection at alternate reflecting surfaces in the laser medium, wherein said second layers are divided in a longitudinal direction of the laser medium, at least a portion of a region of said second layers being removed, said divided second layers deviating from the zigzag path such that the laser beam to be extracted therefrom does not pass through.

2. The laser medium for use in a composite slab type laser as set forth in claim 1, wherein outer surfaces of the removed portions of said layers of the second type are coarse surfaces, said coarse surfaces contacting an outside of said laser medium.

3. The laser medium for use in a composite slab type laser as set forth in claim 2, wherein outer surfaces of the removed portions of said layers of the second type are inclined surfaces, said inclined surfaces contacting an outside of said laser medium.

4. The laser medium for use in a composite slab type laser as set forth in claim 3, wherein a material having a high refractive index is fitted into said layers of the second type at the location of the removed portions thereof.

5. The laser medium for use in a composite slab type laser as set forth in claim 4, wherein said layer of the first type is made of transparent phosphate glass and said layers of the second type are made of phosphate glass containing $Nd^{3+}$ ions which are laser activating material.

6. The laser medium for use in a composite slab type laser as set forth in claim 3, wherein said layer of the first type is made of transparent phosphate glass and said layers of the second type are made of phosphate glass containing $Nd^{3+}$ ions which are laser activating material.

7. The laser medium for use in a composite slab type laser as set forth in claim 2, wherein said layer of the first type is made of transparent phosphate glass and said layers of the second type are made of phosphate glass containing $Nd^{3+}$ ions which are laser activating material.

8. The laser medium for use in a composite slab type laser as set forth in claim 1 wherein outer surfaces of the removed portions of said layers of the second type are inclined surfaces, said inclined surfaces contacting an outside of said laser medium.

9. The laser medium for use in a composite slab type laser as set forth in claim 8, wherein the inclined outer surfaces of the removed portions of said layers of the second type are formed along boundary surfaces between a region including an optical path to be followed by the laser beam and a region deviated from the zigzag path.

10. The laser medium for use in a composite slab type laser as set forth in claim 9, wherein a material having a high refractive index is fitted into said layers of the second type at the location of the removed portions thereof.

11. The laser medium for use in a composite slab type laser as set forth in claim 10, wherein said layer of the first type is made of transparent phosphate glass and said layers of the second type are made of phosphate glass containing $Nd^{3+}$ ions which are laser activating material.

12. The laser medium for use in a composite slab type laser as set forth in claim 9, wherein said layer of the first type is made of transparent phosphate glass and said layers of the second type are made of phosphate glass containing $Nd^{3+}$ ions which are laser activating material.

13. The laser medium for use in a composite slab type laser as set forth in claim 8, wherein a material having a high refractive index is fitted into said layers of the second type at the location of the removed portions thereof.

14. The laser medium for use in a composite slab type laser as set forth in claim 8, wherein said layer of the first type is made of transparent phosphate glass and said layers of the second type are made of phosphate glass containing $Nd^{3+}$ ions which are laser activating material.

15. The laser medium for use in a composite slab type laser as set forth in claim 1, wherein said layer of the first type is made of transparent phosphate glass and said layers of the second type are made of phosphate glass containing $Nd^{3+}$ ions which are laser activating material.

* * * * *